(12) United States Patent
Konda et al.

(10) Patent No.: US 10,628,350 B1
(45) Date of Patent: Apr. 21, 2020

(54) METHODS AND SYSTEMS FOR GENERATING INTERRUPTS BY A RESPONSE DIRECT MEMORY ACCESS MODULE

(71) Applicant: Cavium, Inc., San Jose, CA (US)

(72) Inventors: Dharma Konda, Aliso Viejo, CA (US); Ben Hui, Irvine, CA (US)

(73) Assignee: Cavium, LLC, Santa Clara, CA (US)

( * ) Notice: Subject to any disclaimer, the term of this patent is extended or adjusted under 35 U.S.C. 154(b) by 0 days.

(21) Appl. No.: 15/874,727

(22) Filed: Jan. 18, 2018

(51) Int. Cl.
*G06F 13/24* (2006.01)
*G06F 13/28* (2006.01)

(52) U.S. Cl.
CPC ............ *G06F 13/24* (2013.01); *G06F 13/287* (2013.01)

(58) Field of Classification Search
None
See application file for complete search history.

(56) References Cited

U.S. PATENT DOCUMENTS

| | | | | |
|---|---|---|---|---|
| 9,047,208 B1* | 6/2015 | Moore | ................ | G06F 9/45533 |
| 9,720,733 B1* | 8/2017 | Konda | ................ | G06F 9/4881 |
| 2006/0123160 A1* | 6/2006 | Duckman | ............. | G06F 9/4812 |
| | | | | 710/48 |
| 2013/0055259 A1* | 2/2013 | Dong | .................... | G06F 13/102 |
| | | | | 718/1 |
| 2017/0206169 A1* | 7/2017 | Coppola | ............. | G06F 9/44505 |

\* cited by examiner

*Primary Examiner* — Henry Tsai
*Assistant Examiner* — Aurangzeb Hassan
(74) *Attorney, Agent, or Firm* — Klein, O'Neill & Singh, LLP

(57) ABSTRACT

Methods and systems for generating interrupts are provided. One method includes maintaining an in-pointer array by a response direct memory access (DMA) module of an adapter indicating that a message has been posted at a host memory of a host system coupled to the adapter for sending and receiving data using a network; updating an out-pointer array at the response DMA module by a host system processor, after the host system processor reads the message posted at the host memory; receiving event information by a hardware based, interrupt module of the response DMA module, the interrupt module using the event information and information stored at an interrupt array to determine that an interrupt is to be generated for the host processor; and generating the interrupt for the host processor by the interrupt module, without using an adapter processor.

21 Claims, 5 Drawing Sheets

METHODS AND SYSTEMS FOR GENERATING INTERRUPTS BY A RESPONSE DIRECT MEMORY ACCESS MODULE

TECHNICAL FIELD

The present disclosure relates to computing devices and more particularly, to generating interrupts using a direct memory access (DMA) module.

BACKGROUND

Computing systems are commonly used today. A computing system (may also be referred to as host system) often communicates with a peripheral device, for performing certain functions, for example, an adapter reading and writing information. To process an input/output (I/O) request, an adapter may have to process I/O control blocks (IOCBs) that are received from the computing device.

In conventional systems, a processor of an adapter, executing firmware instructions, typically generates interrupts for the host system. This consumes adapter processor resources. Continuous efforts are being made to better utilize adapter resources.

BRIEF DESCRIPTION OF THE DRAWINGS

The various aspects relating to facilitating communication between devices in a network now will be discussed in detail with an emphasis on highlighting the advantageous features. These novel and non-obvious aspects are shown in the accompanying drawings, which are for illustrative purposes only. These drawings include the following figures, in which like numerals indicate like parts.

DETAILED DESCRIPTION

Figure 1A:
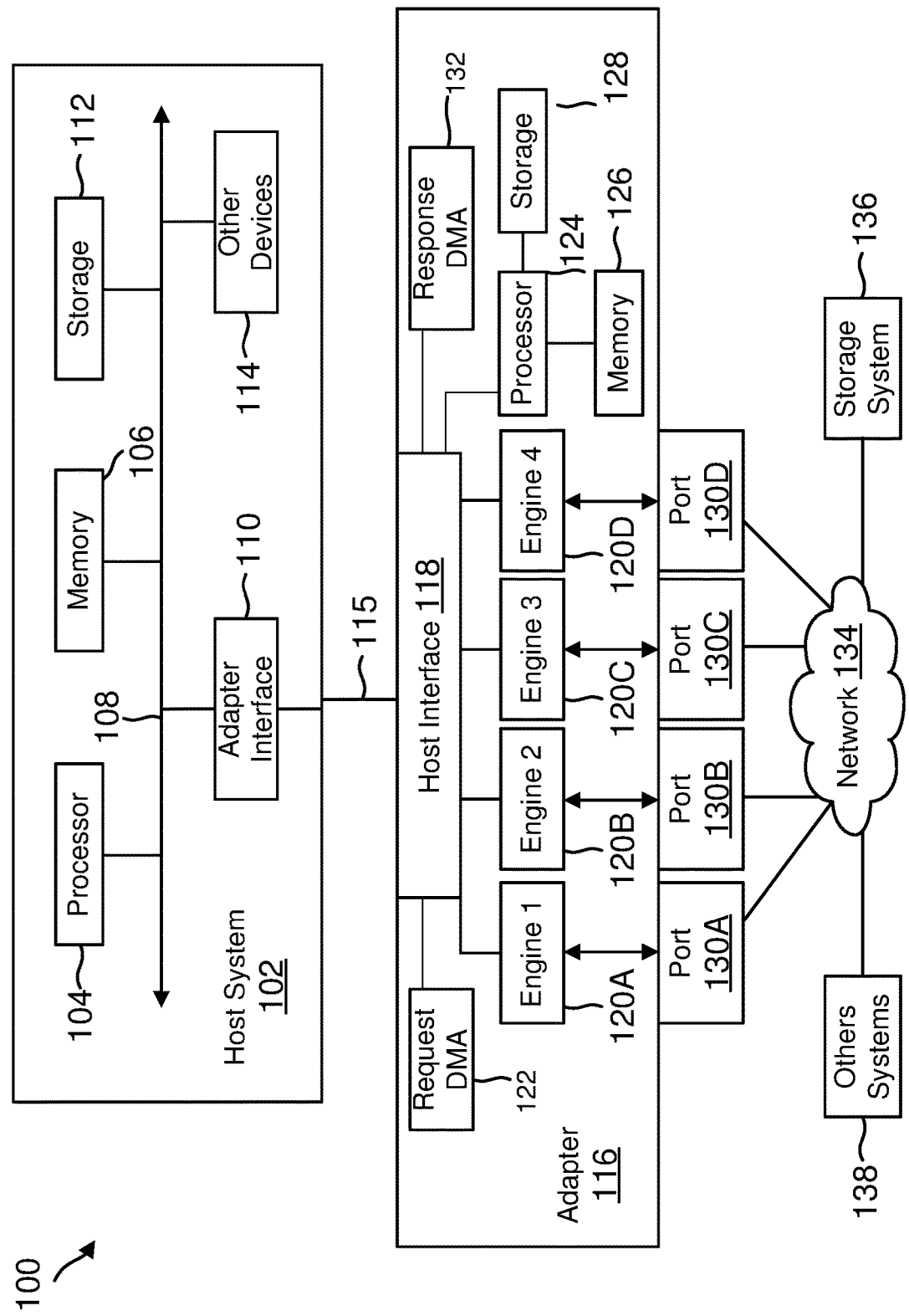
FIG. 1A is a functional block diagram of a system, used according to one aspect of the present disclosure.

The following detailed description describes the various present aspects of the present disclosure with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, and others).

The various aspects disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

System 100:

FIG. 1A is a block diagram of a system 100 configured for use with the present various aspects of the present disclosure. The system 100 may include one or more computing devices/system 102 (may also be referred to as "host system 102") coupled to another device via a link 115, for example, an adapter 116 that interfaces with a network 134. The network 134 may include, for example, additional computing systems 138, storage system 136 and other devices. It is noteworthy that although the description below is based on the interaction between adapter 116 and host system 102, the various aspects disclosed herein are not limited to any particular adapter type or device type.

The computing system 102 may also include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 enables the computing system 102 to interface with the adapter 116 via link 115. Link 115 may be an interconnect system, for example, a PCIe bus. The computing system 102 also includes other devices and interfaces 114, which may include a display device interface, a keyboard interface, a pointing device interface, etc. Details regarding the other devices 114 are not germane to the aspects disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 interfaces with the computer bus 108 to provide processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle network traffic, storage traffic or both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support higher data transfer rates (for example, 10G (Gigabit) or higher). The descriptions of the various aspects described herein are based on using Ethernet (which includes 100 Base-T and/or Gigabit Ethernet) as the network protocol. However, the adaptive aspects disclosed herein are not limited to any particular protocol, as long as the functional goals are met by an existing or new network protocol.

One common storage technology used to access storage systems/devices in a storage area network (SAN) is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via adapter also known as host bus adapters)) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCOE) has been developed to handle both Ethernet and Fibre Channel traffic in a SAN. This functionality would allow Fibre Channel to leverage 10 Gigabit (or higher) Ethernet networks while preserving the Fibre Channel protocol. The adapter 116 shown in FIG. 1A may be configured to operate as an FCOE adapter and may be referred to as FCOE adapter 116. The illustrated adapter 116, however, does not limit the scope of the present aspects. The present aspects may be practiced with adapters having different configurations supporting different network and storage protocols.

Referring back to FIG. 1A, adapter 116 interfaces with the computing system 102 via the link 115 and a host interface 118. In one aspect, the host interface 118 may be a PCI Express interface having logic/circuitry for sending and receiving PCI-Express packets. Details regarding host interface 118 are provided below. Host interface 118 uses direct memory access (DMA) to send and receive information from processor 104 via link 115. A plurality of DMA channels may be used for managing access to link 115. The DMA channels are typically used to move control structures such as IOCBs, input/output status blocks (IOSBs) and data between host system memory 106 and the adapter memory 126. An IOCB (and/or IOSB) is a data structure that is used for communication between host 102 processor/components and adapter 116 components.

As an example, adapter 116 includes a request DMA module 122 and a response DMA module 132. The request DMA module 122 generates DMA requests to retrieve IOCBs from host memory 106, while the response DMA module 132 generates DMA requests for moving IOSBs or any other data to host memory 106, as described below in detail.

The adapter 116 includes a processor 124 that executes firmware instructions out of a memory 126 to control overall adapter operations. Processor 124 may be a reduced instruction set computer (RISC) processor. In conventional adapters, processor 124 generates interrupts for host processor 104 using firmware instructions. This is undesirable because it consumes processor 124 resources and time when it can be executing other operations. The adaptive aspects of the present disclosure generate interrupts using the hardware of the response DMA module 132, as described below in detail.

The adapter 116 may also include storage 128, which may be for example non-volatile memory, such as flash memory, or any other device. The storage 128 may store executable instructions and operating parameters that can be used for controlling overall adapter operations.

As an example, adapter 116 includes a plurality of engines (may be called engine cores, hardware engines or hardware cores) 120A-120D that interface with ports 130A-130D for sending and receiving packets. Engines 120A-120D include hardware and logic to process certain protocol specific packets, for example, Fibre Channel packets. Ports 130A-130D also include logic and circuitry to connect to network 134 for sending and receiving packets. Port logic and circuitry would depend on the connection type and the protocol used for network communication, including Ethernet, Fibre Channel, FCoE or any other protocol. It is noteworthy that although only one processor 124, memory 126 and a request DMA module 122 and a response DMA module 132 are shown, in one aspect, there may be a processor 124, a memory 126, a request DMA module 122 and a response DMA module 132 for each port 130A-130D.

Figure 1B:
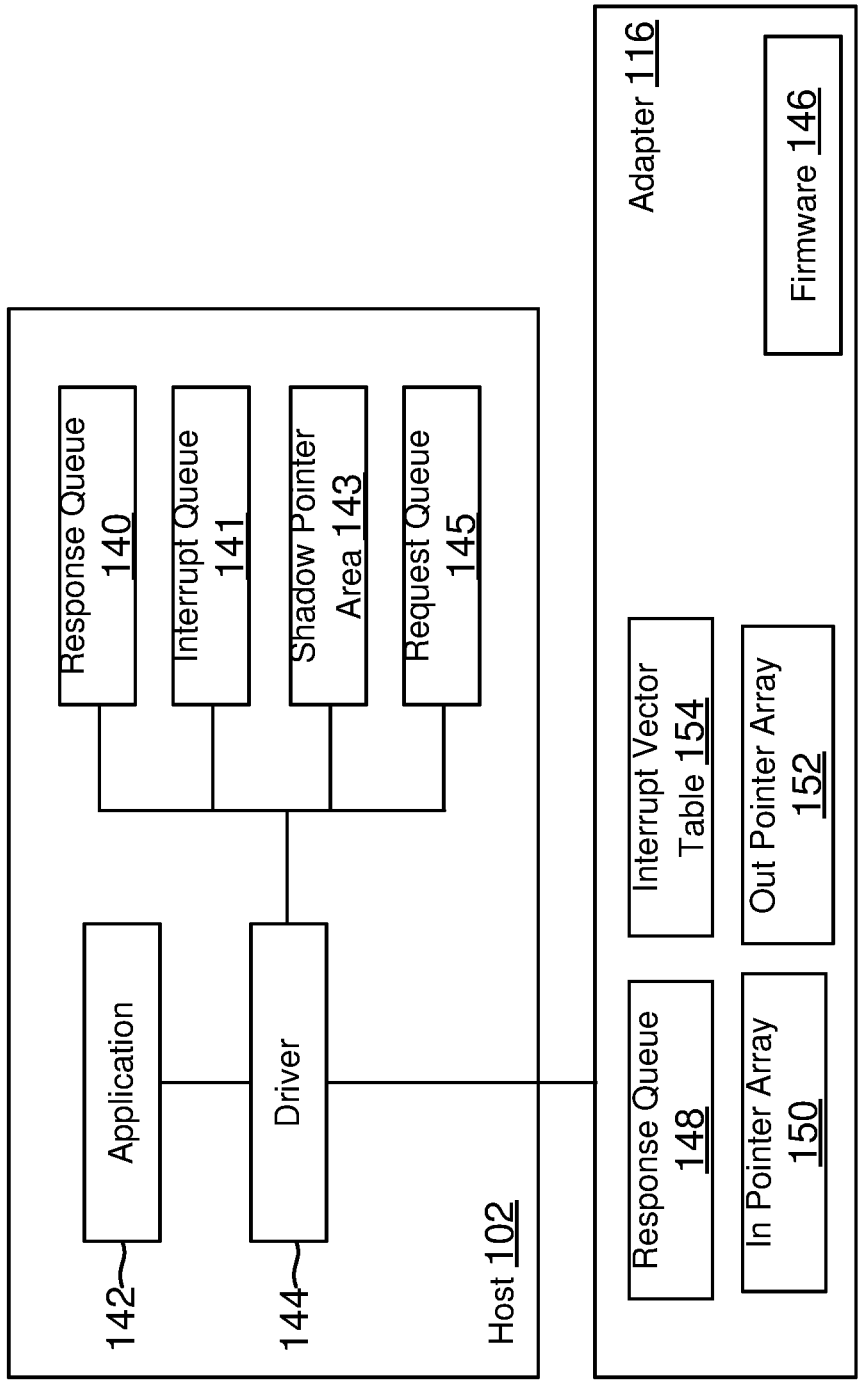
FIG. 1B shows a block diagram of a generic architecture used by the system of FIG. 1A, according to one aspect of the present disclosure.

FIG. 1B shows an example of an architecture used by system 100, according to one aspect of the present disclosure. Processor 104 of host system 102 executes an operating system (not shown) for controlling the overall operations of host system 102. The operating system may be Windows based, Linux operating system, Solaris, or any other operating system type (without derogation of any third-party trademark rights). The various aspects disclosed herein, are of course, not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (input/output (I/O)) at another storage device. The driver 144 processes the request and uses an IOCB to communicate with firmware 146 executed by processor 124 of adapter 116. As an example, there may be a plurality of IOCB types, for example, a generic IOCB for reading or writing data, a continuation IOCB that is related to a previous IOCB for a same data transfer request, and a management IOCB that is used for obtaining status. A completion or communication from adapter 116 may be referred to as I/O status block or "IOSB". An appropriate component of adapter 116 then processes the request.

As an example, host 102 maintains a plurality of queues, for example, a response queue 140, an interrupt queue 141, a shadow pointer area 143 and a request queue 145 at host memory 106. The response queue 140 is used by the response DMA module 132 to place an IOSB or any other data. The interrupt queue 141 is used to place interrupt vectors at host memory 106, described below in detail. The shadow pointer area 143 includes pointers that are updated by the adapter 116 at an in-pointer array 150 at adapter memory 126. The shadow pointer area 143 maintains a copy of the pointers maintained by the adapter 116, as described below in detail. In one aspect, the host memory 106 may not have an interrupt queue 141, per se, and instead, interrupts are sent to a memory-mapped IO addresses and provided to host processor 104. The Interrupt queue 141 is simply shown for convenience to illustrate that interrupts are placed at some location before being sent to processor 104.

In one aspect, adapter 116 also includes a response queue 148 maintained at memory 126 or any other memory that is accessible to the adapter 116. The response queue 148 stores one or more IOSBs that are placed by the response DMA 132 at the response queue 140 using one or more DMA operations, described below in detail.

After the response DMA 132 places an IOSB at the response queue 140, it updates the in-pointer array 150. The in-pointer array 150 stores a pointer indicating a memory location at host memory 106 where the IOSB is stored. The shadow pointer area 143 is also updated with the same pointer information. After the host processor 104 reads the IOSB from the host memory 106, the host processor 104 updates an out-pointer array 152 at the adapter 116 that is also maintained by the response DMA module 132, as described below in detail. The out-pointer array 152 indicates to the adapter 116 and to the response DMA module 132 that the IOSB has been read by the host system 102.

Adapter 116 also maintains an interrupt vector table 154 that includes pointers to message signaled interrupt (MSI) vectors, also known as MSI-X vectors. MSI-X vectors are used by PCI-Express devices to provide interrupts by exchanging special messages that indicate interrupts using a data path instead of dedicated interrupt line. The innovative technology described herein uses MS I-X vectors to generate interrupts. The interrupts are generated by a hardware based, auto interrupt module 168 (FIG. 1C and FIG. 2) of the response DMA module 132, described below in detail. It is noteworthy that although a separate block is shown for the interrupt vector table 154, functionally, the interrupt information may be stored at a QID array 160 described below. The adaptive aspects of the present disclosure are not limited to any specific location or how interrupt information is store.

Figure 1C:
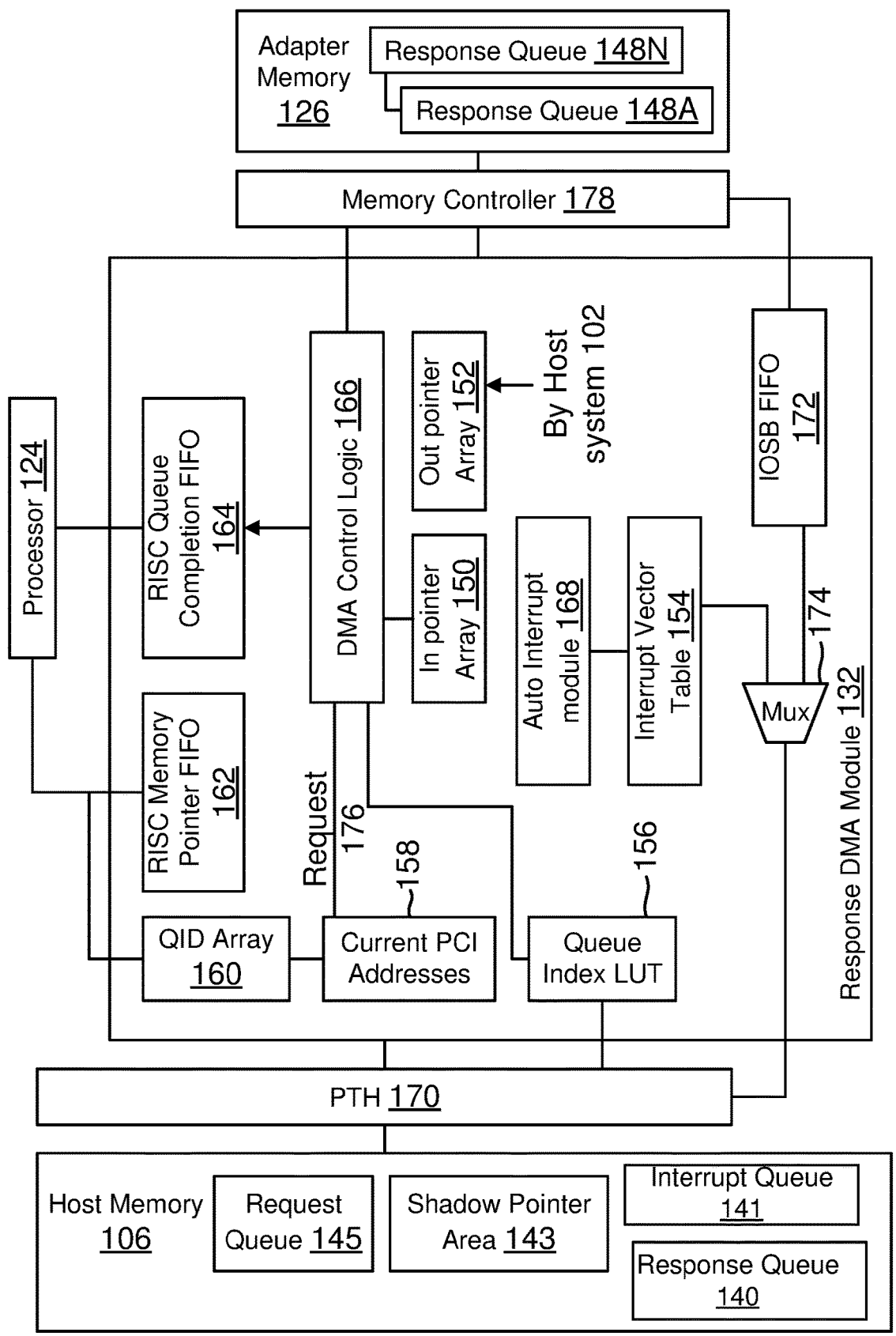
FIG. 1C shows an example of a response DMA module, according to one aspect of the present disclosure.

Response DMA Module 132:

FIG. 1C shows an example of the response DMA module 132, according to one aspect of the present disclosure. The response DMA module 132 interfaces with a PCI-Express transaction handler (PTH) 170 to interface with the host system 102 (Processor 104) for DMA based transactions. PTH is part of a PCI-Express layer that also includes a PCI core used for PCI-Express based address translations, the details of which are not germane to the adaptive aspects described herein. PTH 170 receives IOSBs and interrupts from the response DMA module 132, as described below in detail.

The response DMA module 132 interfaces with adapter memory 126 via a memory controller 178. As an example, the adapter memory 126 stores IOSBs or any other data at response queues 148A-148N (referred to as response queue 148 or response queues 148). Each response queue has a unique identifier and is able to store a certain number of IOSBs. In one aspect, memory 126 stores IOSBs without having to use any response queue and each IOSB includes an indication of a destination response queue 140 at host memory 106. The adaptive aspects described herein are not limited to how IOSBs are stored at the adapter memory 126.

The response DMA module 132 also includes a RISC memory pointer FIFO 162 that stores pointers to where IOSBs are stored, a queue destination and an immediate action bit referred to as "BIT23". FIFO 162 is updated by processor 124. When an IOSB is completed and sent to the host system 102, DMA control logic 166 updates a completion FIFO 164 indicating that the IOSB has been transferred.

The response DMA module 132 uses a queue index (QID) array 160 that stores PCI-Express addresses including base address register (BAR) values, virtual function and physical function identifiers. This information is used to generate a DMA request 176 for the PTH 170. A current PCI address that is being serviced is shown as 158. In one aspect, QID array 160 may include an enable bit for auto-interrupt generation for each queue. It is noteworthy that QID array 160 may also include MSI-X interrupt information.

The response DMA module 132 includes a queue index look up table (LUT) 156 that is used to determine a queue number for one of the queues 148A-148N. In one aspect, the host system 102 provides a physical function (PF) number, a virtual function (VF) number and a page number when it updates a pointer array. This information is used to obtain a queue number that provides an index into the in-pointer array 150 and the out-pointer array 152. The in-pointer array 150 and out-pointer array 152 may be configured to hold an index value, for example, a 16-bit value. The difference in the index value pair provides an indication of IOSBs at host memory response queue 140 have not been consumed by the host system 102. The in-pointer array 150 is written by DMA control logic 166 of the response DMA module 132, while the out-pointer array 152 is written by the host system 102 (e.g. processor 104), after it has read the IOSBs from the response queue 140.

In one aspect, the response DMA module 168 includes an auto interrupt module 168 (may also be referred to herein as module 168) that interfaces with the interrupt vector table 154. Module 168 provides a queue number as an index to the interrupt vector table 154. This enables module 168 to retrieve a MSI-X vector and send it to the host system via a multiplexor (Mux) 174 using a DMA operation. The IOSBs from the response queues 148 are staged at a FIFO 172 and then sent via the Mux 174 and PTH 170 to the host memory 106, using the same data path. Details of module 168 are shown in FIG. 2 and described below in detail.

Figure 2:
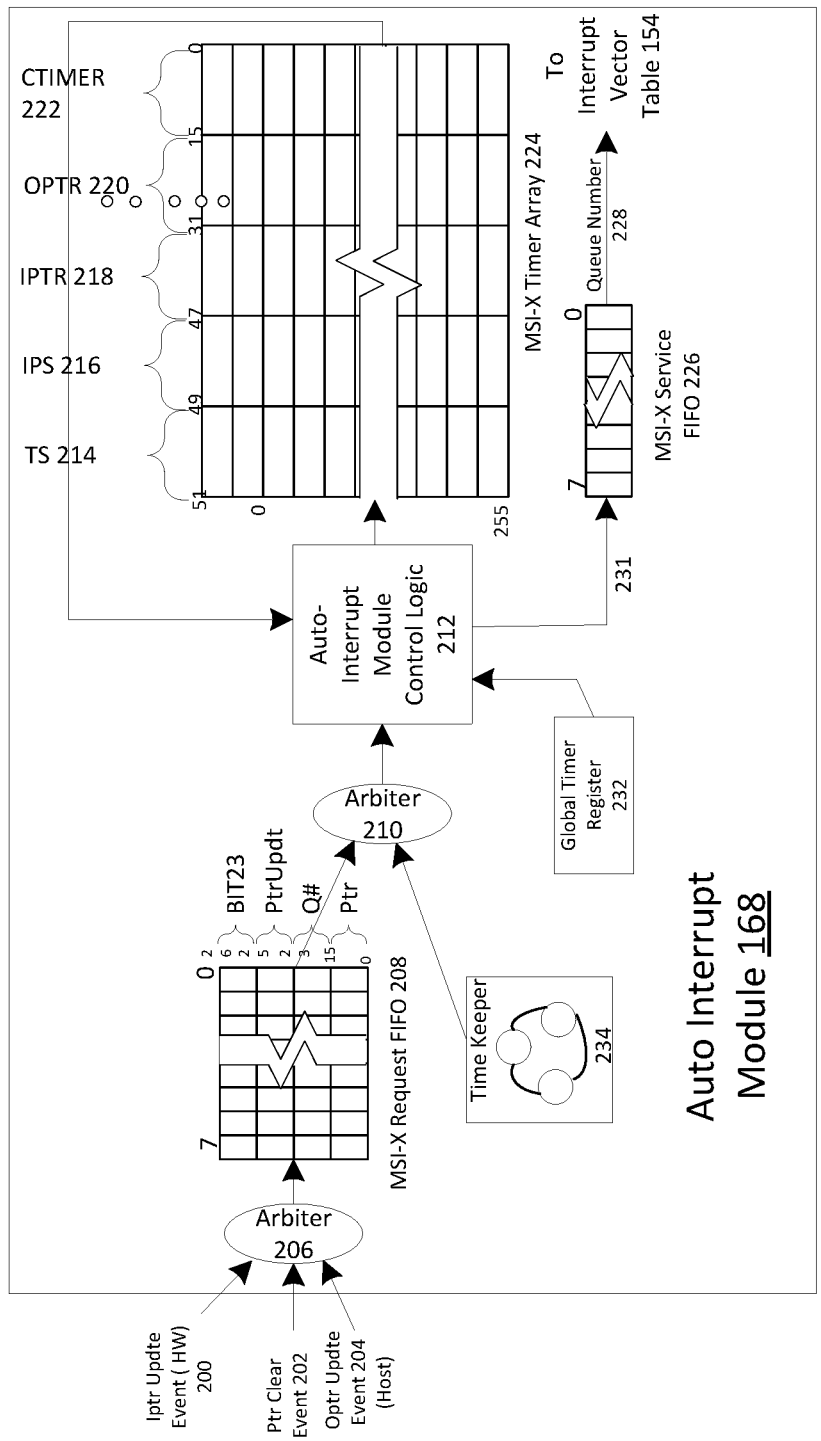
FIG. 2 shows a block diagram of an auto-interrupt module, according to one aspect of the present disclosure.

Auto-Interrupt Module 168:

FIG. 2 shows an example of module 168 for providing hardware based interrupt service, according to one aspect of the present disclosure. In one aspect, module 168 services interrupts for queues 148A-148N by using look-up table entries and state events that are triggered during a DMA operation, for example, in-pointer array 150 update by response DMA module 132, out-pointer array 152 update by the host system 102 and when a timer for a queue has expired.

Module 168 includes control logic 212 (shown as auto-interrupt module control logic) that interfaces with various components of module 168. Module 168 receives information regarding various events at an arbitration module (shown as "arbiter") 206. The events include an in-pointer array 150 update 200 by control logic 166 of the response DMA module 132, a clear event 202 triggered by processor 124 that clears in-pointers and an out-pointer array 152 update event 204 that is initiated by the host processor 104, according to one aspect of the present disclosure. If multiple events are received at arbiter 206 at the same time, then one of them is selected and provided to a MSI-X request FIFO (First-in-First Out) (may be referred to as FIFO 208). FIFO 208 queues requests from events (e.g. 200, 202 and 204) triggered during DMA operations. FIFO 208 stores various bit values, for example, a 'BIT23" that indicates an immediate action event including a reset action triggered by processor 124, "PtrUpdt" bit value indicates a pointer update value, for example, a bit value of 0 indicates an out-pointer update by host processor 104, a bit value of 1 indicates an in-pointer update by the response DMA module 168, and bit value of 2 indicates a clear pointer event triggered by processor 124, "Q #" indicates a response queue 148A-148N and a "Ptr" value indicates an In-pointer and Out-pointer value.

As FIFO 208 receives event information, they are provided to an arbiter 210 with an input from a time keeper 234 that provides a current time. Arbiter 210 provides the event information to control logic 212 that also receives an input from a global timer register 232. The input provides an initial timer value that is loaded into a "current timer field" during different timer states i.e. Load, Load-Run and Run states. The Load state loads the timer 234 to an initial value without decreasing (or decrementing) the timer. The Load-Run state sets the timer to an initial value and starts decrementing the timer. The Run state starts decrementing the timer.

Control logic manages a MSIX timer array 224 (may also be referred to as "array 224") that stores various values indicating a history of the various events during a DMA operation. For example, array 224 stores a timer status "TS" 214 indicating the timer history (Load timer, load-run timer, run timer" for each queue 148A-148N); "IPS" 216 bits indicate the status of an interrupt pending counter status (not shown) for each queue; "IPTR" 218 provides the in-pointer value, while "OPTR 220" indicates an out-pointer value and "CTIMER" 222 bit values indicate a current timer value based on input from time keeper 234.

Control logic 212 receives triggering events from FIFO 210, evaluates array 224 and then provides a queue number via a signal 231 to a MSIX service FIFO 226 (also referred to as FIFO 226). FIFO 226 pipelines various queue numbers for which an interrupt needs to be generated. The queue number (228) from FIFO 226 is used as an index to the interrupt vector table 154. An interrupt vector is then sent to the host system via Mux 174 and PTH 170 using a DMA operation via the same data path used for sending the IOSBs to the host system 102.

In one aspect, control logic 212 provides hardware assisted interrupts, instead of using firmware 146. The interrupt service is triggered based on an event and the state of the MSIX array 224, at any given time. The events that trigger interrupts include in-pointer updates, out-pointer updates and when a queue timer expires. Control logic 212 also updates array 224 based on the events and a current state of a timer. The following Tables I, II and III below provide different conditions for generating interrupts using module 168 and the MSIX array 224, according to one aspect of the present disclosure.

Table I shows four different conditions listed as 0, 1, 2 and 3 under the column labelled "S/N" for in-pointer array 150 update by module 168. Column "Bit 23" indicates a bit value that is set by processor 124 for an immediate action operation. Column "HQ Empty" indicates whether the host response queue 140 is empty i.e. if an in-pointer value is equal to an out-pointer array 152 value.

Column "Timer State (Present)" stores bit values indicating a present timer state for timer 234. The timer 234 may have the "Load", "Load_Run" and "Run" states that are described above. Column "Timer State (Next)" indicates a "next" timer state after an event i.e. after the in-pointer array 150 update. Column "MSIX Xfr" stores a bit value indicating when an interrupt is generated and serviced by module 168 (shown by "Yes"). Column "Host Queue Status" stores a bit value indicating the response queue 140 status either as "non-empty" or "empty".

Table II shows two conditions for an out-pointer array 152 update by the host system 102, while Table III shows four conditions for time keeper 234. The various columns of Table II have been described above with respect to Table I. Table III also includes an additional column labelled as "Timer TC" that provides a timer count. The other columns of Table III have been described above with respect to Table I, and for brevity sake, are not being repeated. It is noteworthy that although the examples below are shown as tables, any other type of data structures may be used to implement the various aspects of the present disclosure.

TABLE I (For In-pointer Update by Module 168)

| S/N | Bit23 | HQ Empty* | Timer State (Present) | Timer State (Next) | MSIX Xfr | Host Queue Status (*Before In-Pointer array 150 update) |
|---|---|---|---|---|---|---|
| 0 | 0 | 0 | Load, Load_Run | Run | | Non-Empty |
| 1 | 0 | 1 | | Load | Yes | Empty |
| 2 | 1 | 0 | | Load | Yes | Non-Empty |
| 3 | 1 | 1 | | Load | Yes | Empty |

TABLE II (For Out-pointer Update by Host 102)

| S/N | HQ Empty | Timer State (Present) | Timer State (Next) | MSIX Xfr | Host Queue Status (After Out-pointer array 152 update) |
|---|---|---|---|---|---|
| 0 | 0 | Load, Load_Run | Load_Run | | Non-Empty |
| 1 | 1 | | Load | | Empty |

TABLE III (For Time Keeper 234)

| S/N | HQ Empty | Timer (TC) | Timer State (Present) | Timer State (Next) | MSIX Xfr | Host Queue Status |
|---|---|---|---|---|---|---|
| 0 | 0 | 0 | Load_Run, Run | Run | | Non-Empty |

TABLE III-continued (For Time Keeper 234)

| S/N | HQ Empty | Timer (TC) | Timer State (Present) | Timer State (Next) | MSIX Xfr | Host Queue Status |
|---|---|---|---|---|---|---|
| 1 | 0 | 1 | Run | Load | yes | Non-Empty |
| 2 | 1 | 0 | | | | Empty |
| 3 | 1 | 1 | | Not Reachable | | Empty |

In one aspect, response DMA module 132 guarantees that information to host memory 106 is delivered in a specific order i.e. data frames received by adapter 116 are delivered first, followed by IOSB s, shadow pointer mirroring at shadow pointer area 143 and interrupts. In one aspect, PTH 170 notifies response DMA 170 after an IOSB has been moved. Control logic 166 then moves the pointer from FIFO 162 to completion FIFO 164. The shadow pointer area 143 is updated and then an interrupt is sent.

Figure 3:
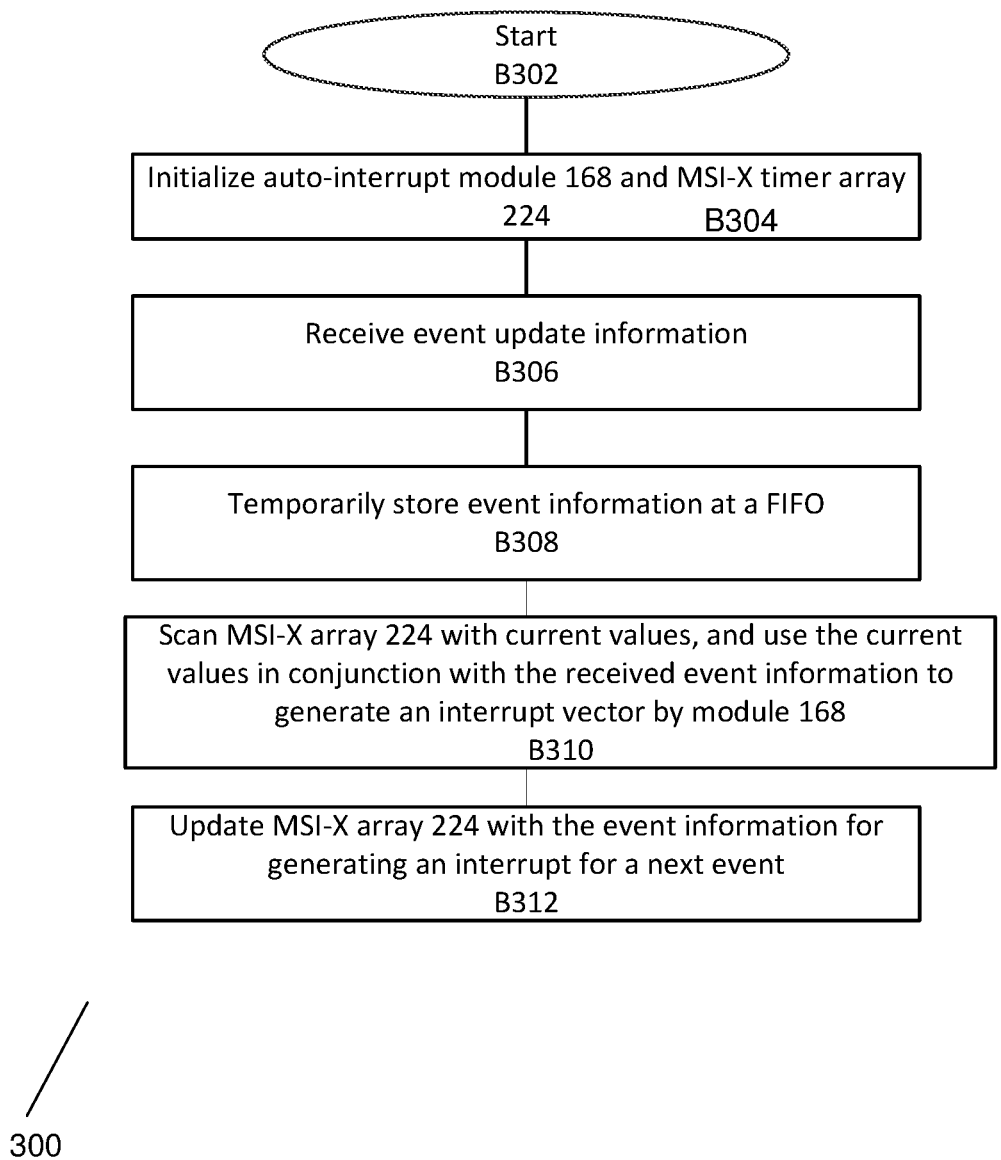
FIG. 3 shows a process for generating hardware based interrupts using the auto-interrupt module, according to one aspect of the present disclosure.

Process Flows:

FIG. 3 shows an example of a process flow for generating an interrupt using the response DMA module 132 and module 168, according to one aspect of the present disclosure. The process begins in block B302, when host system 102 and adapter 116 have been initialized and operational. Interrupt generation by the response DMA module is enabled by setting a configuration bit at adapter 116. It is noteworthy that interrupt generation may be enabled for each response queue 140 by setting a bit at QID array 160. The conditions for which the interrupts may be set are also configured. In one aspect, the configuration settings may be set by host system 102 or by a management console (not shown) managing host 102 and adapter 116. In one aspect, response DMA module 132 may be configured to generate an interrupt based on certain events, for example, when the in-pointer array 150 and the out-pointer array 152 are updated, a timer event has occurred or any other configured event. The various adaptive aspects described herein are not limited to any specific event type or event frequency.

In block B304, module 168 and MSI-X array 224 are initialized. MSI-X array 224 may store various bit values, for example, timer state 214, interrupt pending status 216, in-pointer value 218, out-pointer value 220 and a current timer value 222. These values have been described above in detail.

Event information 200, 202 or 204 are received in block B306. In block B308, the received event information is stored at FIFO 208. The event information is then provided to control logic 212 by arbiter 210. In block B310, control logic 212 scans MSI-X array 224 and uses the event information to generate a queue number 231 for FIFO 226. A queue number 228 is then used as an index to the interrupt vector table 154. The interrupt vector is then DMAed by the response DMA module 132 to the host processor 124. The interrupt vector is placed at interrupt queue 141 at host memory 106.

In block B312, MSI-X array 212 is updated with the received event information for generating an interrupt for a next event. The updated array is then used as a current value for the next event.

In one aspect, hardware of module 168 generates interrupts, instead of processor 124. This optimizes the resources of processor 124.

In one aspect, methods and systems for generating interrupts are provided. One method includes maintaining an in-pointer array (e.g. 150) by a response direct memory access (DMA) module (e.g. 132) of an adapter (e.g. 116) indicating that a message has been posted at a host memory (e.g. 106) of a host system (e.g. 102) coupled to the adapter for sending and receiving data using a network; updating an out-pointer array (e.g. 152) at the response DMA module by a host system processor (e.g. 104), after the host system processor reads the message posted at the host memory; receiving event information (e.g. 200, 202 or 204) by a hardware based, interrupt module (e.g. 168) of the response DMA module, the interrupt module using the event information and information stored at an interrupt array (e.g. 224) to determine that an interrupt is to be generated for the host processor; generating the interrupt for the host processor by the interrupt module, without using an adapter processor; and updating the interrupt array by the interrupt module with the event information for generating another interrupt for a next event, without involving the processor.

In another aspect, an adapter (e.g. 116) having a response DMA module is provided. The DMA module includes an in-pointer array (e.g. 150) indicating that a message has been posted at a host memory (e.g. 106) of a host system (e.g. 102) coupled to the adapter for sending and receiving data using a network; an out-pointer array (e.g. 152) that is updated by a host system processor (e.g. 104), after the host system processor reads the message posted at the host memory; and an interrupt module (e.g. 168) that receives event information (e.g. 200, 202 and 204), uses the event information and information stored at an interrupt array (e.g. 224) to determine that an interrupt is to be generated for the host processor; generates the interrupt for the host processor, without using an adapter processor; and updates the interrupt array with the event information for generating another interrupt for a next event, without involving the processor.

In yet another aspect, a non-transitory, machine readable storage medium having stored thereon instructions for performing a method is provided. Machine executable code which when executed by at least one machine, causes the machine to: maintain an in-pointer array by a response direct memory access (DMA) module of an adapter indicating that a message has been posted at a host memory of a host system coupled to the adapter for sending and receiving data using a network; update an out-pointer array at the response DMA module by a host system processor, after the host system processor reads the message posted at the host memory; receive event information by a hardware based, interrupt module of the response DMA module, the interrupt module using the event information and information stored at an interrupt array to determine that an interrupt is to be generated for the host processor; generate the interrupt for the host processor by the interrupt module, without using an adapter processor; and update the interrupt array by the interrupt module with the event information for generating another interrupt for a next event, without involving the processor.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any particular adapter type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A machine implemented method, comprising:
maintaining an in-pointer array by a response direct memory access (DMA) module of an adapter indicating that a message has been posted at a host memory of a host system the host system having a host system processor interfacing with the adapter, for sending and receiving data using a network connection; wherein the response DMA module sends data to the host memory via a DMA operation;
updating an out-pointer array at the response DMA module by the host system processor, after the host system processor reads the message posted at the host memory;
receiving event information by a hardware based, interrupt module of the response DMA module, the interrupt module using the event information and information stored at an interrupt array to determine that an interrupt is to be generated for the host processor;
wherein the event information includes one of an update to the in-pointer array; an update to the out-pointer array, and a message from the adapter processor to clear the in-pointer array and the out-pointer array;
updating a shadow pointer array at the host memory by the adapter processor, when the event information includes an up-date to the in-pointer array, the shadow pointer array configured to store information of the in-pointer array at the host memory;
generating the interrupt for the host processor by the interrupt module, without using an adapter processor; and
updating the interrupt array by the interrupt module with the event information for generating another interrupt for a next event, without using the adapter processor;
wherein when multiple event information are received at a same time, then one of the multiple event formation is selected by an arbiter of the interrupt module and provided to control logic of the interrupt module.

2. The method of claim 1, wherein an update to the in-pointer array is an event for which an interrupt is generated.

3. The method of claim 1, wherein the interrupt array stores a timer state that triggers an interrupt by the interrupt module.

4. The method of claim 1, wherein an interrupt is generated when the adapter processor sets a bit indicating an immediate action operation and a host queue status indicates a non-empty status prior to an update of the in-pointer array.

5. The method of claim 1, wherein an interrupt is generated when a present run timer state transitions to a load timer state and a host queue status is non-empty.

6. The method of claim 1, wherein the control logic scans the interrupt array and uses the event information to determine if an interrupt is to be generated.

7. A non-transitory, machine readable storage medium having stored thereon instructions for performing a method, comprising machine executable code which when executed by at least one machine, causes the machine to:
maintain an in-pointer array by a response direct memory access (DMA) module of an adapter indicating that a message has been posted at a host memory of a host system, the host system having a host system processor interfacing with the adapter, for sending and receiving data using a network connection; wherein the response DMA module sends data to the host memory via a DMA operation;
update an out-pointer array at the response DMA module by the host system processor, after the host system processor reads the message posted at the host memory;
receive event information by a hardware based, interrupt module of the response DMA module, the interrupt module using the event information and information stored at an interrupt array to determine that an interrupt is to be generated for the host processor; wherein the event information includes one of an update to the in-pointer array; an update to the out-pointer array, and a message from the adapter processor to clear the in-pointer array and the out-pointer array;
update a shadow pointer array at the host memory by the adapter processor, when the event information includes an up-date to the in-pointer array, the shadow pointer array configured to store information of the in-pointer array at the host memory;
generate the interrupt for the host processor by the interrupt module, without using an adapter processor; and
update the interrupt array by the interrupt module with the event information for generating another interrupt for a next event, without using the adapter processor;
wherein when multiple event information are received at a same time, then one of the multiple event formation is selected by an arbiter of the interrupt module and provided to control logic of the interrupt module.

8. The storage medium of claim 7, wherein an update to the in-pointer array is an event for which an interrupt is generated.

9. The storage medium of claim 7, wherein the interrupt array stores a timer state that triggers an interrupt by the interrupt module.

10. The storage medium of claim 7, wherein an interrupt is generated when the adapter processor sets a bit indicating an immediate action operation and a host queue status indicates a non-empty status prior to an update of the in-pointer array.

11. The storage medium of claim 7, wherein an interrupt is generated when a present run timer state transitions to a load timer state and a host queue status is non-empty.

12. The storage medium of claim 7, wherein the control logic scans the interrupt array and uses the event information to determine if an interrupt is to be generated.

13. An adapter, comprising:
a response direct memory access (DMA) module having:
an in-pointer array stored at an adapter memory indicating that a message has been posted at a host memory of a host system having a host processor interfacing with the adapter for sending and receiving data using a network;
an out-pointer array that is updated by the host system processor, after the host system processor reads the message posted at the host memory; and
an interrupt module that receives event information, uses the event information and information stored at an interrupt array to determine that an interrupt is to be generated for the host processor; generates the interrupt for the host processor, without using an adapter processor; and updates the interrupt array with the event information for generating another interrupt for a next event, without using the adapter processor;
wherein the event information includes one of an update to the in-pointer array; an update to the out-pointer array, and a message from the adapter processor to clear the in-pointer array and the out-pointer array;

wherein a shadow pointer array is updated at the host memory by the adapter processor, when the event information includes an up-date to the in-pointer array, the shadow pointer array configured to store pointer information of the in-pointer array at the host memory; wherein when multiple event information are received at a same time, then one of the multiple event formation is selected by an arbiter of the interrupt module and provided to control logic of the interrupt module.

14. The adapter of claim 13, wherein an update to the in-pointer array is an event for which an interrupt is generated.

15. The adapter of claim 13, wherein the interrupt array stores a timer state that triggers an interrupt by the interrupt module.

16. The adapter of claim 13, wherein an interrupt is generated when the adapter processor sets a bit indicating an immediate action operation and a host queue status indicates a non-empty status prior to an update of the in-pointer array.

17. The adapter of claim 13, wherein an interrupt is generated when a present run timer state transitions to a load timer state and a host queue status is non-empty.

18. The adapter of claim 13, wherein the control logic scans the interrupt array and uses the event information to determine if an interrupt is to be generated.

19. The method of claim 1, wherein the adapter is configured to process network traffic, storage traffic or both network and storage traffic using the network connection.

20. The storage medium of claim 7, wherein the adapter is configured to process network traffic, storage traffic or both network and storage traffic using the network connection.

21. The adapter of claim 13, wherein the adapter is configured to process network traffic, storage traffic or both network and storage traffic using the network connection.

* * * * *

UNITED STATES PATENT AND TRADEMARK OFFICE
CERTIFICATE OF CORRECTION

PATENT NO. : 10,628,350 B1  
APPLICATION NO. : 15/874727  
DATED : April 21, 2020  
INVENTOR(S) : Konda et al.

Page 1 of 1

It is certified that error appears in the above-identified patent and that said Letters Patent is hereby corrected as shown below:

In the Drawings

In Drawings Sheet 4, reference number 200, delete "Iptr Updte Event ( HW)" and insert -- Iptr Update Event (HW) --, therefor.

In Drawings Sheet 4, reference number 204, delete "Updte" and insert -- Update --, therefor.

In the Specification

In Column 1, Line 47, delete "disclosure;" and insert -- "disclosure." --, therefor.

In Column 5, Line 50, delete "MS I-X" and insert -- MSI-X --, therefor.

In Column 7, Line 19, delete "'BIT23'" and insert -- "BIT23" --, therefor.

In Column 8, Line 8, delete ""Bit 23"" and insert -- "Bit23" --, therefor.

In the Claims

In Column 11, Line 11, in Claim 1, delete "host system the" and insert -- host system, the --, therefor.

Signed and Sealed this  
Fourth Day of August, 2020

Andrei Iancu  
*Director of the United States Patent and Trademark Office*